UNITED STATES PATENT OFFICE.

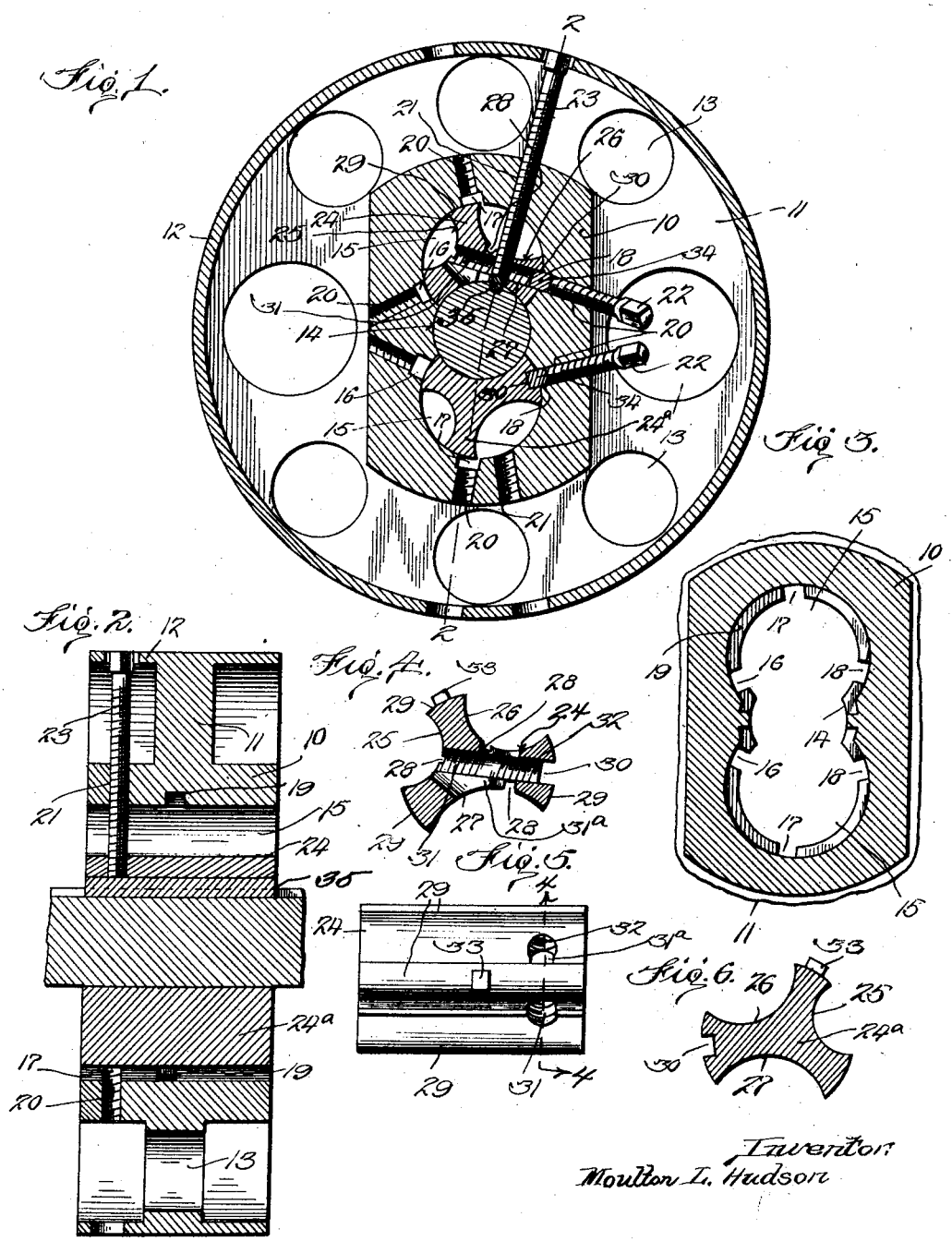

MOULTON L. HUDSON, OF CANTON, NORTH CAROLINA.

ADJUSTABLE PULLEY.

1,405,590. Specification of Letters Patent. Patented Feb. 7, 1922.

Application filed April 6, 1921. Serial No. 458,915.

*To all whom it may concern:*

Be it known that I, MOULTON L. HUDSON, a citizen of the United States, residing at Canton, in the county of Haywood and State of North Carolina, have invented certain new and useful Improvements in Adjustable Pulleys, of which the following is a specification, reference being had to the accompanying drawings.

This invention relates to pulleys, band wheels, friction wheels, gear wheels, etc., and particularly to those rotary elements of this character adapted to be mounted upon shafts and which are adjustable to suit different sized shafts.

The general object of this present invention is to provide a pulley or like mechanical element with means whereby it may be readily adjusted and carried upon shafts of different sizes.

A further object is to provide means of this character which permits the pulley to fit a plurality of different sizes of shafting and which may be readily and quickly adjusted from one size to another and without in any way weakening the pulley or weakening its bearing upon the shaft.

And a further object is to provide a pulley of this character having a hub provided with an elongated chamber or shaftway through it, and provide rotatable bearing members in this shaftway adapted to be shifted to a plurality of different positions in order to engage different sizes of shaft.

Other objects will appear in the course of the following description.

My invention is illustrated in the accompanying drawings, wherein:—

Figure 1 is a transverse sectional view through a pulley constructed in accordance with my invention;

Figure 2 is a section on the line 2—2 of Figure 1;

Figure 3 is a fragmentary section through the hub of the pulley intersecting the groove 19;

Figure 4 is a cross section on the line 4—4 of Figure 5;

Figure 5 is an elevation of the bearing member shown in Figure 4;

Figure 6 is a cross section of the bearing member 24ª;

Referring to these drawings, it will be seen that I have illustrated a pulley which is adapted to be adjusted to three different sizes of shaft, namely to shafts having ⅝″ diameter, ¾″ diameter, and 1″ diameter. The pulley comprises a central or hub portion 10, a medially disposed web 11, and a rim 12, the web being perforated at 13 at a plurality of points in order to decrease the weight of the pulley. It is to be understood, however, that the particular construction of this pulley, band wheel, or like element forms no part of my present invention and that the means whereby this element may be clamped upon a shaft is equally applicable to gear wheels, friction wheels, or any other wheels which it is desired to engage with the shaft.

The hub portion 10 projects on each side beyond the web 11 and is formed with a diametrically extending, relatively wide slot formed to provide a central passageway 14 and two end passageways 15. The end passageways are approximately sectors of a circle and intersect the circular central passageway 14. The central passageway 14 in a pulley intended to be used on 1″, ¾″ and ⅝″ shafts is approximately 1″ in diameter. The passageways 15 under these circumstances will have a diameter of approximately 1¼″. Each of the passageways or chambers 15 is formed with a plurality of axially extending keyways 16, 17 and 18 extending through the entire length of the hub, and extending from the keyway 16 to the keyway 18 and disposed approximately midway of the length of the hub is a circumferentially extending groove 19 having a depth approximately the same as the depth of the keyways. Extending through the wall surrounding the chambers 14 and 15 are three screw-threaded openings 20 which intersect the keyways 16, 17 and 18, and also extending through the opposite end walls and extending into the chambers or passageways 15 are the screw-threaded openings 21. Clamping screws 22 are adapted to be disposed through the openings 20, and screws 23 are adapted to be disposed through the openings 21.

Adapted to be disposed in each of the chambers or passageways 15 are the shaft engaging members 24 and 24ª. The member 24 is formed with three longitudinally extending, concave bearing faces 25, 26 and 27. Each of these bearing faces forms part of a circle of a different diameter from any other bearing face. Each of these bearing faces for the member 24 is formed with a longitudinally extending keyway 28. The outer faces of the walls between these recesses or bearing faces 25, 26 and 27 are convexly rounded, as at 29, to fit the inner face of the chambers 15 and one of the outer curved faces 29 is longitudinally grooved, as at 30. A screw-threaded aperture 31 extends inward from the curved face 25 and two intersecting screw-threaded apertures 31ª extend centrally inward from the faces 26 and 27. From the keyway 30 extends a screw-threaded aperture 32 which intersects the apertures extending inward from the faces 26 and 27, as illustrated in Figure 4. Projecting from one of the curved faces 29 is a lug 33 which is adapted to engage in the groove 19. The bearing member 24ª is of exactly the same character as the bearing member 24, and is also provided with the lug 33 but is not formed with the keyways 28. It is, however, formed on one of its wings or walls with the longitudinally extending keyway 30. It is not formed with the perforations 31 and 32 intersecting perforations 31ª extending inward from the faces 26 and 27.

The bearing members 24 and 24ª have their bearing face on the same radius, that is the faces of the member 24ª have the same radius as the concave faces of the bearing member 24, and by shifting these bearing members 24 and 24ª within the chambers 15 so as to bring their corresponding bearing faces opposite each other, the shaft aperture may be reduced or increased from ⅝" to an inch in the size of pulley or like element which is under consideration. There are screw-theaded apertures 20 which intersect each of the three keyways 16, 17 and 18 in the chambers 15, and the end walls of the chambers 15 are each formed with the screw-threaded apertures 21 disposed to one side of the adjacent screw-threaded aperture 20.

In the use of this device, the members 24 and 24ª are placed in position with the lugs 33 in engagement with the groove 19 and then these members 24 and 24ª are rotated until the desired bearing face 25, 26 or 27 faces the central shaft opening. For instance, if it is desired that the pulley shall be applied to a shaft 1" in diameter, the members 24 and 24ª are turned so that the faces 26 confront each other and form the wall of the shaft opening. Under these circumstances, the keyways 30 of the two members 24 and 24ª will align with the keyways 18 and then the keys 34 are inserted to lock the members 24 and 24ª in their adjusted positions. The screws 22 are then inserted through the corresponding screw-threaded openings 20 and impinge upon the keys 34 so as to hold these keys firmly in place and prevent their withdrawal. The screw 23 is used to lock the shaft key 35 in place, this screw 23 being adapted to extend through either the aperture 20 or 21 to engage the shaft key 35. It extends through the aperture 20 adjacent the aperture 21 when the member 24 is turned so as to bring the face 25 toward the shaft.

It will be seen that I use three keys and three set screws for holding the adjustable bearing members in place and holding the pulley in place upon a shaft, and it will likewise be obvious that no bushing is required or any fitting up of the pulley before the same is put on the shaft. It will be obvious that the pulley can be made in any size, bore, diameter, or width or any style desired, and that while I have illustrated a pulley adapted to three different sizes of shaft, a larger pulley may be adapted to fit four different sizes of shaft. It is likewise obvious that the pulley may be either a split pulley as desired and that the adjustment which I have provided does not weaken the pulley in any way. The change in the adjustment of the pulley can be made in five minutes or less and this feature proves very valuable in "break-down" jobs where speed is essential.

While I have illustrated certain details of construction and arrangement of parts, it will be obvious that the principle of the invention may be embodied in other forms without departing from the spirit of the invention.

I claim:—

1. A rotatable element having a hub formed with a shaft passage, a pair of passages circular in cross section, extending parallel to and intersecting the shaft passage, cylindrical bearing members rotatably disposed in and fitting the last named passages and each having a plurality of concave bearing faces of different curvatures, and means for clamping said bearing members in rotatively adjusted positions.

2. A rotatable element having a hub formed to provide a shaft passage, a pair of passages parallel to and intersecting the shaft passage and formed with a plurality of longitudinally extending keyways, bearing members rotatively disposed in the last named passages and having a plurality of concave bearing faces of different curvatures, keyways disposed in said members and adapted to coact with the keyways in the passages, keys adapted to be inserted in said keyways, and means for holding said keys in place.

3. A rotatable element having a hub formed to provide a shaft passage, a pair of passages parallel to and intersecting the shaft passage and formed with a plurality of longitudinally extending keyways, bearing members rotatively disposed in the last named passages and having a plurality of concave bearing faces of different curvatures, keyways disposed in said members and adapted to coact with the keyways in the passages, keys adapted to be inserted in said keyways, and means for holding said keys in place comprising set screws passing through the hub and intersecting said keyways.

4. A rotatable element having a hub formed to provide a shaft passage, a pair of passages parallel to and intersecting the shaft passage and formed with a plurality of longitudinally extending keyways, bearing members rotatively disposed in the last named passages and having a plurality of concave bearing faces of different curvatures, keyways disposed in said members and adapted to coact with the keyways in the passages, keys adapted to be inserted in said keyways, and means for holding said keys in place comprising set screws passing through the hub and intersecting said keyways, one of said members being formed with intersecting passages extending through the member from all of its concave faces and having shaft keyways on all of its concave faces intersecting said openings, and screws adapted to pass through the hub and pass through said openings in said member and extend into the shaft keyway whereby to clamp the shaft in any position.

5. A rotatable element having a hub formed with a shaft passage and having a pair of passages extending parallel to but intersecting the shaft passage, said last named passages having a greater diameter than the shaft passage, bearing members fitting in the last named passages and rotatively disposed therein and having a plurality of concave bearing faces, each of said concave faces being formed with a longitudinally extending keyway in its bottom and the periphery of the wing between two of said concave faces being formed with a longitudinally extending keyway adapted to register with any one of the keyways in the shaft passage, keys adapted to be inserted in said keyways to hold the bearing members from rotation and lock them in adjusted positions, set screws extending through the hub and adapted to engage said keys to prevent detachment therefrom, and means for holding the shaft key from detachment.

6. A rotatable element having a hub formed with a centrally disposed shaft passage and with a pair of passages parallel to but intersecting the shaft passage and larger in diameter than the shaft passage and having three equi-distantly spaced, longitudinally extending keyways, bearing members disposed in said last named passages, each formed to provide a plurality of concavely curved bearing faces, the outer edge of the wall between two of said bearing faces being formed with a longitudinally extending keyway adapted to register with any one of the keyways in the corresponding bearing passage, the hub having screw threaded openings extending inward from the exterior thereof to said keyway in the passages and intersecting the same and having screw-threaded openings extending through the interior of said passages to one side of the adjacent screw-threaded passages, set screws insertible through said screw-threaded passages, and keys disposable in said keyways, one of the rotatable bearing members being formed with keyways extending longitudinally of and at the bottom of the concave faces and adapted to receive the key of the shaft.

7. A rotatable element having a hub formed with a diametrically elongated shaft passage, shaft engaging members adapted to be disposed in the ends of said passage on each side of the shaft and rotatable each in the corresponding end of said passage, each of said shaft engaging members having a plurality of shaft engaging seats, the seats of each member being of different diameters, means engaging said members with the shaft passage against longitudinal movement of the members when the members are turned with corresponding seats confronting each other, said means permitting the disengagement of said members when they are turned to a predetermined position, means for locking the members in adjusted position, and means for holding the rotatable element in rotative engagement with the shaft.

8. A rotatable element having a diametrically elongated shaft passage, the opposite ends of the passage being circular in cross section, shaft engaging members disposed in opposite ends of the passage and rotatably adjustable therein and each formed with a plurality of corresponding shaft engaging seats, each member having seats of different diameters, and means for locking said bearing members in adjusted positions with their corresponding seats confronting each other.

9. A rotatable element having a hub formed with a central shaft passage and a pair of passageways parallel to and intersecting the shaft passage, each of said last named passages having a circumferential groove intermediate the ends of the passage and each of said last named passages having a plurality of longitudinally extending keyways, bearing members disposed in said last named passages and having a plurality of concave faces of different curvatures, each member having a lug on its periphery adapted to be engaged in said groove and having on its periphery a longitudinally extending keyway adapted to register with any one of the keyways in the corresponding passage, keys adapted to be inserted in said keyways to thereby hold the bearing members in rotatively adjusted positions, and means for locking said keys in place.

10. A rotatable element having a hub formed with a central shaft passage and a pair of passageways parallel to and intersecting the shaft passage, each of said last named passages having a circumferential groove intermediate the ends of the passage and each of said last named passages having a plurality of longitudinally extending keyways, bearing members disposed in said last named passages and having a plurality of concave faces of different curvatures, each member having a lug on its periphery adapted to be engaged in said groove and having on its periphery a longitudinally extending keyway adapted to register with any one of the keyways in the corresponding passage, keys adapted to be inserted in said keyways to thereby hold the bearing members in rotatably adjusted positions, means for locking said keys in place, and means for locking the rotatable member to a shaft extending through said hub.

In testimony whereof I hereunto affix my signature.

MOULTON L. HUDSON.